US011913195B2

(12) United States Patent
Bae et al.

(10) Patent No.: US 11,913,195 B2
(45) Date of Patent: Feb. 27, 2024

(54) HYDRAULIC MACHINE

(71) Applicant: VOLVO CONSTRUCTION EQUIPMENT AB, Eskilstuna (SE)

(72) Inventors: Sangki Bae, Changwon-si (KR); Donguk Choi, Changwon-si (KR); Gyeongmo Min, Busan (KR); Byeongsoo Kim, Changwon-si (KR)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 0 days.

(21) Appl. No.: 18/095,200

(22) Filed: Jan. 10, 2023

(65) Prior Publication Data

US 2023/0235537 A1 Jul. 27, 2023

(30) Foreign Application Priority Data

Jan. 25, 2022 (KR) ........................ 10-2022-0010805

(51) Int. Cl.

| | |
|---|---|
| ***E02F 9/22*** | (2006.01) |
| ***E02F 9/20*** | (2006.01) |
| ***F15B 11/17*** | (2006.01) |
| ***F15B 15/18*** | (2006.01) |

(52) U.S. Cl.

CPC .......... *E02F 9/2235* (2013.01); *E02F 9/2004* (2013.01); *E02F 9/2228* (2013.01); *E02F 9/2292* (2013.01); *E02F 9/2296* (2013.01); *F15B 11/17* (2013.01); *F15B 15/18* (2013.01); *E02F 9/2285* (2013.01)

(58) Field of Classification Search

CPC ...... F15B 2211/6652; F15B 2211/2656; E02F 9/2296; E02F 9/2235; F04B 13/00

See application file for complete search history.

(56) References Cited

U.S. PATENT DOCUMENTS

| | | | | |
|---|---|---|---|---|
| 9,790,966 | B2 | 10/2017 | Akiyama et al. | |
| 2010/0218493 | A1* | 9/2010 | Nakamura ............ | E02F 9/2285 60/426 |
| 2020/0056349 | A1* | 2/2020 | Hijikata ................ | E02F 9/2296 |
| 2020/0056351 | A1 | 2/2020 | Ono et al. | |
| 2022/0259828 | A1* | 8/2022 | Zhang .................. | E02F 9/2292 |

OTHER PUBLICATIONS

Extended European Search Report for EP Patent Application No. 23151710.3, dated Jun. 16, 2023, 10 pages.

* cited by examiner

*Primary Examiner* — Abiy Teka
(74) *Attorney, Agent, or Firm* — Sage Patent Group

(57) ABSTRACT

Provided is a hydraulic machine including an actuator, a first pump and a second pump configured to supply pressurized fluid to the actuator, a driving motor configured to drive the first and second pumps, a first operator input device through which an operator's desire to operate the actuator is input, and a controller. The controller determines displacements of the first and second pumps corresponding to the operator's desire and a speed of rotation of the driving motor and controls the first pump, the second pump, and the driving motor to operate according to the displacements of the first and second pumps and the speed of rotation of the driving motor finally determined in the determination of the displacements of the first and second pumps.

18 Claims, 5 Drawing Sheets

HYDRAULIC MACHINE

CROSS REFERENCE TO RELATED APPLICATIONS

This application claims priority to Korean Patent Application No. 10-2022-0010805, filed on Jan. 25, 2022, the disclosure and content of which is incorporated by reference herein in its entirety.

BACKGROUND

Field

The present disclosure generally relates to a hydraulic machine. In particular aspects, the disclosure relates to a hydraulic machine able to improve efficiency by reducing flow rate loss.

Description of Related Art

A hydraulic machine performing work by operating a working device using hydraulic power is well known. However, such a hydraulic machine may have a loss in flow rate and thus may have a limited efficiency. Therefore, there has been demand for a hydraulic machine having improved efficiency.

SUMMARY

According to an aspect, a hydraulic machine may include: an actuator; a first pump and a second pump configured to supply pressurized fluid to the actuator; a driving motor configured to drive the first and second pumps; a first operator input device through which an operator's desire to operate the actuator is input; and a controller. The controller may: a) determine displacements of the first and second pumps corresponding to the operator's desire and a speed of rotation of the driving motor; and b) control the first pump, the second pump, and the driving motor to operate according to the displacements of the first and second pumps and the speed of rotation of the driving motor finally determined in the operation a). The operation a) may include an operation a1) in which the controller determines desired flow rates (QAreq, QBreq) of the first and second pumps corresponding to the operator's desire input through the first operator input device, determines a maximum displacement (DispMax) of the first and second pumps, determines speeds of rotation (RPMA1, RPMB1) at which the first and second pumps discharge the flow rates (QAreq, QBreq) with the maximum displacement (DispMax), and determines a value (RPM1) according to the speeds of rotation (RPMA1, RPMB1). This aspect of the disclosure may seek to provide a hydraulic machine having improved efficiency by reducing flow rate loss.

In some examples, the controller may determine a higher value, a lower value, or an average value of the speeds of rotation (RPMA1, RPMB1) as the value (RPM1).

In some examples, the operation a) may include an operation a2) in which the controller determines a displacement (DispA1) of the first pump with which the first pump discharges the flow rate (QAreq) at the value (RPM1) and a displacement (DispB1) of the second pump with which the second pump discharges the flow rate (QBreq) at the value (RPM1).

In some examples, the operation a) may include an operation a3) in which the controller limits the displacement (DispA1) and the displacement (DispB1) to a displacement (DispA2) and a displacement (DispB2), respectively, so that a sum of output torque of the first pump and output torque of the second pump is equal to or less than predetermined maximum output torque that both the first pump and the second pump are able to generate together.

In some examples, the operation a) may include an operation a4) in which the controller determines a speed of rotation (RPMA2) at which the first pump discharges the flow rate (QAreq) with the displacement (DispA2) and a speed of rotation (RPMB2) at which the second pump discharges the flow rate (QBreq) with the displacement (DispB2), and determines a value (RPM2) according to the speed of rotation (RPMA2) and the speed of rotation (RPMB2).

In some examples, the controller may determine a higher value, a lower value, or an average value of the speeds of rotation (RPMA2, RPMB2) as the value (RPM2).

In some examples, the hydraulic machine may further include a second operator input device configured to receive an operator's desire for mode. When the determined value (RPM2) is higher than a predetermined mode-specific speed of rotation corresponding to a mode selected by using the second operator input device, the predetermined mode-specific speed of rotation may be determined as the value (RPM2).

In some examples, the controller may determine the displacement (DispA2) and the displacement (DispB2) by following equations:

$$\text{displacement}(\text{Disp}A2)=\text{displacement}(\text{Disp}A1)\times\text{torque ratio; and}$$

$$\text{displacement}(\text{Disp}B2)=\text{displacement}(\text{Disp}B1)\times\text{torque ratio,}$$

where the torque ratio=(predetermined maximum output torque that both the first pump and the second pump are able to generate together)/(sum of the output torque of the first pump and the output torque of the second pump), and a minimum of the torque ratio is 0, whereas a maximum of the torque ratio is 1.

In some examples, the hydraulic machine of claim 4, further including a second operator input device configured to receive an operator's desire for mode. The maximum output torque may be a predetermined mode-specific maximum torque, which both the first pump and the second pump are able to generate together, corresponding to a mode selected by using the second operator input device.

In some examples, the operation a) may include an operation a3) in which the controller limits the displacement (DispA1) and the displacement (DispB1) to a displacement (DispA2') and a displacement (DispB2') so that a sum of output torque of the first pump and output torque of the second pump is equal to or less than a predetermined maximum output torque that both the first pump and the second pump are able to generate together. The maximum output torque may be a predetermined maximum torque that both the first pump and the second pump are able to generate together in terms of hardware.

In some examples, the hydraulic machine may further include a second operator input device configured to receive an operator's desire for mode. The operation a) may include: an operation a4) in which the controller determines a speed of rotation (RPMA2') at which the first pump discharges the flow rate (QAreq) with the displacement (DispA2') and a speed of rotation (RPMB2') at which the second pump discharges the flow rate (QBreq) with the displacement (DispB2'), and determines a value (RPM2') according to the speed of rotation (RPMA2') and the speed of rotation (RPMB2'); and an operation a5) in which the controller limits the value (RPM2') to a value (RPM3) so that a sum of output power of the first pump and output power of the second pump is equal to or less than a predetermined mode-specific maximum output power, which the first pump and the second pump are able to generate together, corresponding to a mode selected by using the second operator input device.

In some examples, the controller may determine the value (RPM3) by a following equation:

value(RPM3)=RPM2'×power ratio, where power ratio=(predetermined mode-specific maximum output power, which both the first pump and the second pump are able to generate together, corresponding to the mode selected by using the second operator input device)/(sum of output power of the first pump and output power of the second pump), and a minimum value of the power ratio is 0, whereas a maximum of the power ratio is 1.

In some examples, when the determined value (RPM3) is lower than a predetermined minimum speed of rotation, the predetermined minimum speed of rotation may be determined as the value (RPM3).

In some examples, when the determined value (RPM3) is higher than the predetermined mode-specific speed of rotation corresponding to the mode selected by using the second operator input device, the predetermined mode-specific maximum speed of rotation may be determined as the value (RPM3).

In some examples, when no operator's desire is input through the first operator input device, a predetermined minimum speed of rotation or a predetermined mode-specific speed of rotation corresponding to the mode selected by using the second operator input device may be determined as the value (RPM3).

In some examples, the hydraulic machine may further include a second operator input device configured to receive an operator's desire for mode. The controller may determine flow rates corresponding to a predetermined mode-specific speed of rotation (RPM0) corresponding to a mode selected by using the second operator input device and a displacement (DispA0) of the first pump and a displacement (DispB0) of the second pump corresponding to the operator's desire input through the first operator input device, as the flow rate (QAreq) and the flow rate (QBreq).

In some examples, the hydraulic machine may further include a control valve disposed between the first and second pumps and the actuator to allow or block supply flow of pressurized fluid from the first pump and the second pump to the actuator. The control valve may be operated to have a degree of opening corresponding to the operator's desire input through the first operator input device.

In some examples, when at least one of the determined speed of rotation (RPMA1) and the determined speed of rotation (RPMB1) may be lower than a predetermined minimum speed of rotation, the predetermined minimum speed of rotation may be determined as the at least one of the determined speed of rotation (RPMA1) and the determined speed of rotation (RPMB1).

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

DESCRIPTION OF THE DRAWINGS

With reference to the appended drawings, below follows a more detailed description of aspects of the disclosure cited as examples.

DETAILED DESCRIPTION

Aspects set forth below represent information to enable those skilled in the art to practice the disclosure.

Hereinafter, examples of the present disclosure will be described in detail with reference to the accompanying drawings.

Figure 1:
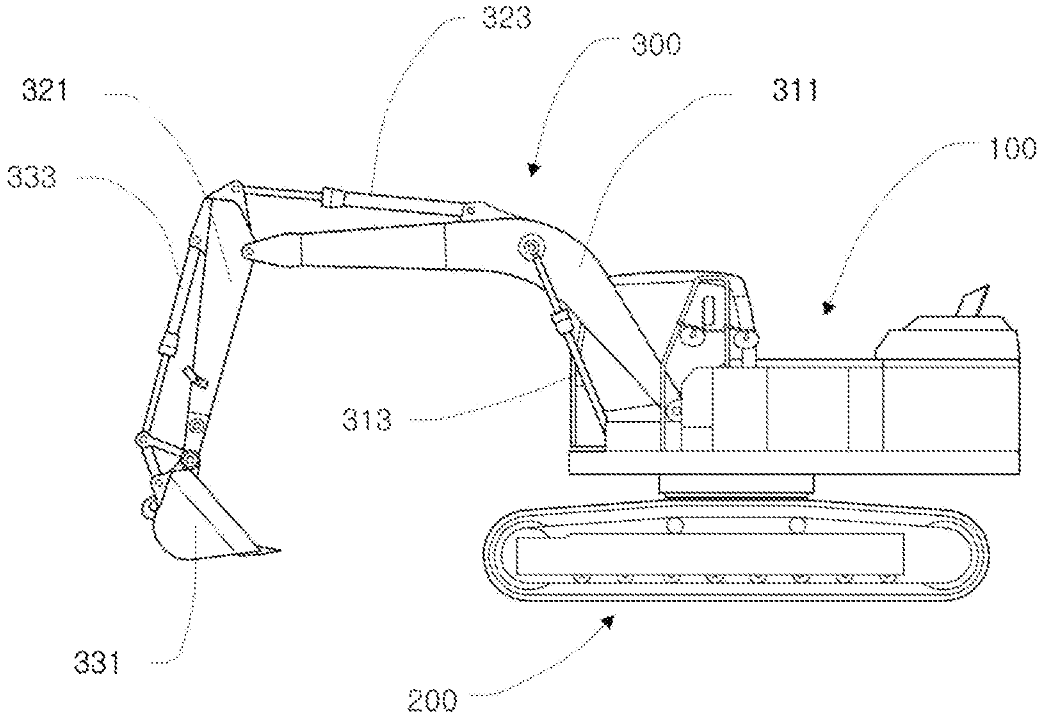
FIG. 1 is a view illustrating an external appearance of a hydraulic machine according to some examples.

FIG. 1 is a view illustrating an external appearance of a hydraulic machine according to some examples.

A hydraulic machine may work by operating a working device 300 using hydraulic pressure. In some examples, the hydraulic machine may be a construction machine.

In some examples, as illustrated in FIG. 1, the hydraulic machine may be an excavator. The hydraulic machine may include an upper structure 100, a lower structure 200, and the working device 300.

The lower structure 200 includes a travel actuator to allow the hydraulic machine to travel. The travel actuator may be a hydraulic motor.

The upper structure 100 may include a tank, a first pump, a second pump, a pilot pump, a driving motor, a control valve, a cabin, and the like. In addition, the upper structure 100 may swing with respect to the lower structure 200 by using a swing actuator. The swing actuator may be a hydraulic motor.

The working device 300 allows the hydraulic machine to work. The working device 300 may include a boom 311, an arm 321, and a bucket 331, and, in addition, a boom actuator 313, an arm actuator 323, and a bucket actuator 333 configured to actuate the boom 311, the arm 321, and the bucket 331. The boom actuator 313, the arm actuator 323, and the bucket actuator 333 may be hydraulic cylinders.

Figure 2:
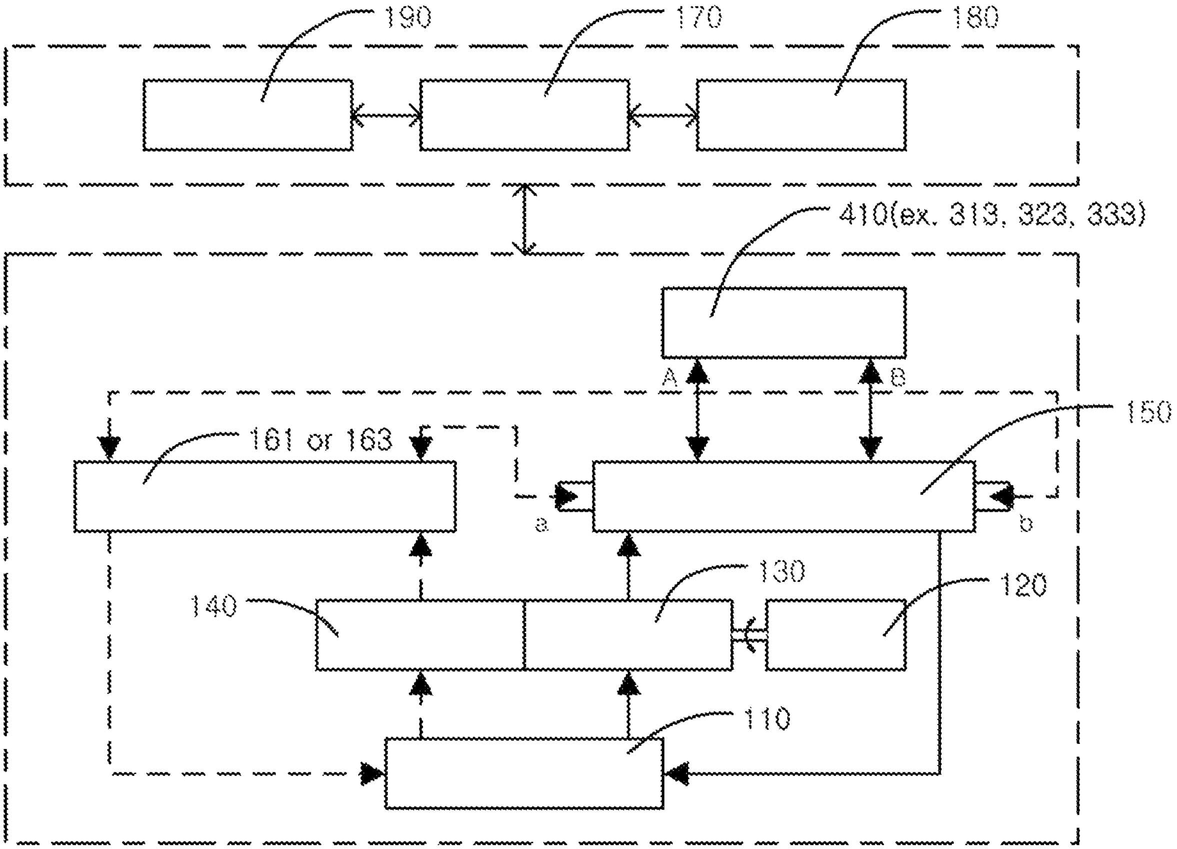
FIG. 2 is a diagram schematically illustrating a configuration of a hydraulic circuit of a hydraulic machine according to some examples.

FIG. 2 is a diagram schematically illustrating a configuration of a hydraulic circuit of a hydraulic machine according to some examples.

In some examples, a construction machine such as an excavator may include a working part and a control part configured to control the working part while electrically and mechanically communicating with the working part.

The working part may include a driving motor 120, a working fluid source 130, a pilot fluid source 140, a control valve 150, an actuator 410, a tank 110, and the like. When the working fluid source 130 is driven by the driving motor 120, the working fluid source 130 draws fluid from the tank 110 and directs the fluid to the control valve 150. When the control valve 150 is in the neutral position, the control valve 150 returns working fluid from the working fluid source 130 to the tank 110 instead of supplying the working fluid to the actuator 410. When pilot fluid is supplied to side 'a' of the control valve 150, the control valve 150 is moved to supply working fluid to side A of the actuator 410. In contrast, when pilot fluid is supplied to side 'b' of the control valve 150, the control valve 150 is moved to supply working fluid to side B of the actuator 410. The actuator 410 that has received the working fluid works and returns working fluid to the control valve 150 through the opposite side (i.e., side B or side A). The working fluid that has come from the actuator 410 returns to the tank 110, thereby forming a closed circuit of working fluid. This circuit of working fluid is generally referred to as a main circuit. Pilot fluid may also form a closed circuit similarly to working fluid. The pilot fluid source 140 draws fluid from the tank 110 and supplies the drawn fluid to a remote control valve 161 or an electronic proportional pressure reducing (EPPR) valve 163. The remote control valve 161 or the EPPR valve 163 supplies pilot fluid to side 'a' or side 'b' of the control valve 150 in response to an input received through a first operator input device 180 (e.g., an input generated by operating a control device such as a control lever, a control pedal, or a steering wheel). When the control valve 150 that has received the pilot fluid is moved, pilot fluid on the opposite side (i.e., side 'b' or side 'a') is pushed out and returns to the tank 110 through the remote control valve 161 or the EPPR valve 163, thereby forming a closed circuit of pilot fluid. The closed circuit of pilot fluid is generally referred to as the pilot circuit.

In FIG. 2, only a single circuit of working fluid is illustrated for sake of brevity and only a single control valve 150 is illustrated in the circuit of working fluid. However, in some examples, the hydraulic machine may be provided with a plurality of working fluid sources 130, e.g., a first pump and a second pump, and may include a circuit of working fluid for the first pump and a circuit of working fluid for the second pump, i.e., two circuits of working fluid. (However, in terms of the tank 110, the hydraulic machine including the two pumps, i.e., the first pump and the second pump, and the single tank 110 may be regarded as having a single circuit of working fluid, since the entirety of working fluid is supplied by the tank 110 and returns to the tank 110.) In addition, a plurality of control valves may be arranged in parallel in each of the circuits of working fluid. In some of such examples, the circuit may have a fluid passage referred to as a parallel passage. In addition, a plurality of RCVs (or a plurality of PPRVs) may be arranged in parallel in the pilot circuit. A single pilot circuit including a single pilot pump is generally provided for the hydraulic machine, but the present disclosure is not limited thereto.

In some examples, the hydraulic machine is generally provided with a single tank 110 configured to supply fluid to the working fluid source 130 and the pilot fluid source 140 and store returning fluid, but the present disclosure is not limited thereto.

The control part may include a controller 170, the first operator input device 180, a second operator input device 190, and the like. In some examples, the controller 170 may include an electronic control unit (ECU). In some of such examples, the ECU may include a central processing unit (CPU), a memory, and the like. In some examples, each of the first operator input device 180 and the second operator input device 190 may include at least one of a control lever, a variety of switches (e.g., a rotating switch, a membrane switch, a toggle switch, etc.), and a touch screen.

The first operator input device 180 may be moved by an operator to indicate an operator's desire to operate the actuator 410. The control valve 150 is operated to have a degree of opening corresponding to the operator's desire input through the first operator input device 180, and thereby, the actuator 410 supplied with working fluid through the control valve 150 may be operated in response to the operator's desire. The operator input device, in particular, the first operator input device 180 may be an electric input device or a mechanical input device. In an example in which the first operator input device 180 is an electric input device, an input is input to the controller 170 as an electric signal through the input device, and the controller 170 directs an electric control signal to the EPPR valve 163 to control the control valve 150. In contrast, in an example in which the first operator input device 180 is a mechanical input device, an input received through the input device directly operates the remote control valve 161 and is sent to the control valve 150 as a hydraulic signal to control the control valve 150. In a typical example, the mechanical first operator input device and the remote control valve 161 may be provided as an integrated part, and a pressure sensor configured to detect the pressure of a hydraulic signal sent to the control valve 150 by the remote control valve 161 may be provided. Thus, the controller 170 may receive an electric signal from the pressure sensor to determine the input to the mechanical first operator input device.

The second operator input device 190 may be moved by an operator to indicate an operator's desire to select a mode. The mode indicates an operator-desired speed of rotation at which the hydraulic machine should rotate. When a desired mode is input through the second operator input device 190, the speed of rotation of the driving motor 120 may be determined according to the input value.

Figure 3:
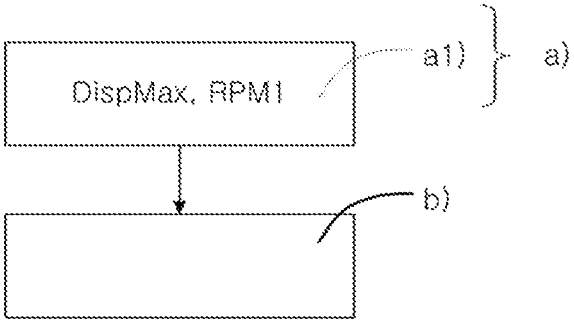
FIG. 3 is a diagram illustrating a process according to an example in which the controller controls the first pump, the second pump, and the driving motor in response to inputs received through the first operator input device and the second operator input device.

FIG. 3 is a diagram illustrating a process according to an example in which the controller controls the first pump, the second pump, and the driving motor in response to inputs received through the first operator input device and the second operator input device.

The hydraulic machine according to the present disclosure may use an available maximum displacement of the pump and adjust the speed of rotation of the driving motor as a compensation therefor.

a1) When the operator's desire is input through the first operator input device 180, the controller 170 may determine desired flow rates QAreq and QBreq for pump A and pump B corresponding to the operator's desire input through the first operator input device 180.

In some examples, the controller 170 may determine flow rates corresponding to a predetermined mode-specific speed of rotation RPM0 corresponding to a mode selected by using the second operator input device 190 and the displacement DispA0 of pump A and the displacement DispB0 of pump B corresponding to the operator's desire input through the first operator input device 180, as QAreq and QBreq.

In some examples, the controller may determine the flow rates corresponding to the operator's desire (e.g., a hydraulic pilot signal transmitted to the control valve 150 from the remote control valve 161 or an electrical pilot signal transmitted to the controller 170 from the EPPR valve 163) input through the first operator input device 180, as QAreq and QBreq, using a mode-specific lookup table.

Afterwards, a speed of rotation RPMA1 at which pump A discharges QAreq in a maximum displacement DispMax and a speed of rotation RPMB1 at which pump B discharges QBreq in a maximum displacement DispMax may be determined, and RPM1 according to RPMA1 and RPMB1 (i.e., RPM1 varying according to RPMA1 and RPMB1) may be determined. In some examples, a higher value, a lower value, or an average value of RPMA1 and RPMB1 may be determined as RPM1.

Here, meeting the lower limit of the speed of rotation of the driving motor may provide an environment in which the pilot pump can operate. (However, this may not be necessary for an electro-hydraulic control valve because a hydraulic machine having a typical control valve may detect the operation of the first operator input device using a pilot pressure, while a hydraulic machine having an electro-hydraulic control valve can drive a pump by directly detecting the operation of the electric first operator input device without an initial pilot pressure.) For example, when the lower limit of the speed of rotation is 800 RPM, even in the case that RPMA1 or RPMB1 is determined to be less than 800 RPM, RPMA1 or RPMB1 may be modified and finally determined to be 800 RPM.

b) Afterwards, pump A, pump B, and the driving motor 120 may be controlled to operate according to the displacements and the speed of rotation finally determined in a1). That is, in the example illustrated in FIG. 3, pump A, pump B, and the driving motor 120 may be controlled to operate according to DispMax and RPM1.

According to characteristics of the pump, the pump has greater flow rate loss when operating with a smaller displacement. Therefore, since the hydraulic machine according to the present disclosure is designed such that the pump may operate with a greater displacement, it is advantageously possible to improve efficiency by reducing flow rate loss.

The flow rate discharged from the pump is proportional to a product of the displacement of the pump and the speed of rotation. In the hydraulic machine according to some examples of the present disclosure, when no operator's desire is input through the first operator input device (i.e., when idling: a desired flow rate for the pump is low when idling), the pump is controlled such that the displacement thereof is maintained as large as possible but the speed of rotation thereof is immediately reduced to a lower value. Thus, it is possible to reduce fuel efficiency during idling.

Figure 4:
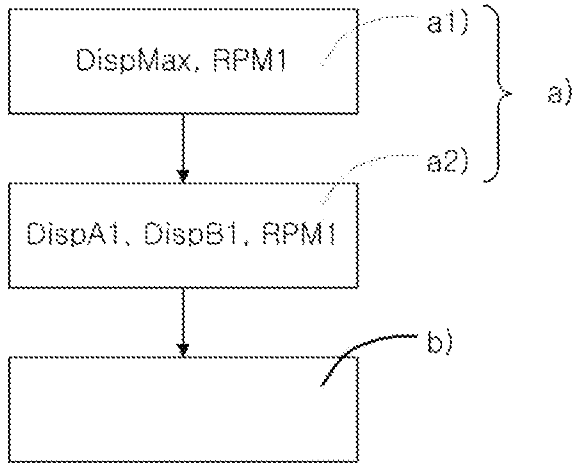
FIG. 4 is a diagram illustrating a process according to a modified example in which the controller controls the first pump, the second pump, and the driving motor in response to inputs received through the first operator input device and the second operator input device.

FIG. 4 is a diagram illustrating a process according to a modified example in which the controller controls the first pump, the second pump, and the driving motor in response to inputs received through the first operator input device and the second operator input device.

a1) The operation a1) of the example illustrated in FIG. 3 is performed.

a2) Afterwards, the controller 170 may determine the displacement DispA1 of pump A with which pump A discharges QAreq at RPM1 and the displacement DispB1 of pump B with which pump B discharges QBreq at RPM1.

b) Afterwards, pump A, pump B, and the driving motor 120 may be controlled to operate according to the displacements and the speed of rotation finally determined in a2). That is, in the example illustrated in FIG. 4, pump A, pump B, and the driving motor 120 may be controlled to operate according to DispA1, DispB1, and RPM1.

Figure 5:
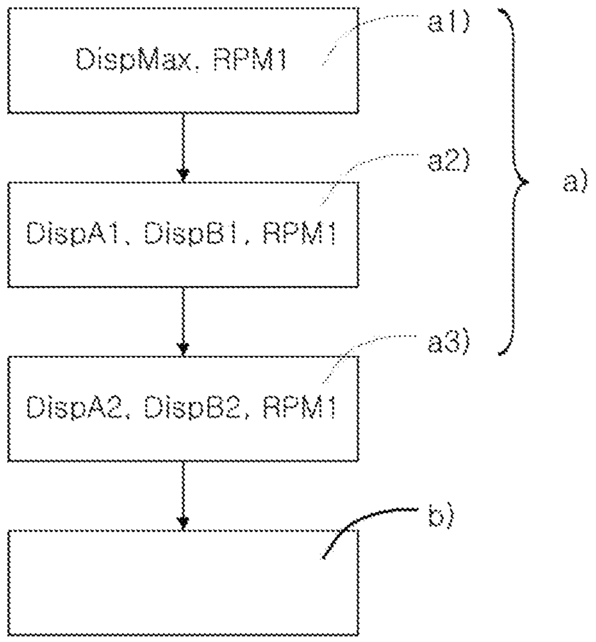
FIG. 5 is a diagram illustrating a process according to a modified example in which the controller controls the first pump, the second pump, and the driving motor in response to inputs received through the first operator input device and the second operator input device.

FIG. 5 is a diagram illustrating a process according to a modified example in which the controller controls the first pump, the second pump, and the driving motor in response to inputs received through the first operator input device and the second operator input device.

a1 and a2) The operations a1) and a2) of the example illustrated in FIG. 4 are performed.

a3) Afterwards, DispA1 and DispB1 may be limited to DispA2 and DispB2 such that a sum of output torque of pump A and output torque of pump B is equal or less than predetermined maximum output torque that both pump A and pump B may generate together.

DispA2 and DispB2 may be determined by the following Equations.

$$DispA2=DispA1\times\text{Torque Ratio}$$

$$DispB2=DispB1\times\text{Torque Ratio}$$

Here, torque ratio=(predetermined maximum output torque that both pump A and pump B may generate together)/(sum of the output torque of pump A and the output torque of pump B).

The minimum of the torque ratio is 0, whereas the maximum of the torque ratio is 1.

In some examples, the maximum output torque may be predetermined mode-specific torque predetermined according to an input to the second operator input device 190.

b) Afterwards, pump A, pump B, and the driving motor 120 may be controlled to operate according to the displacements and the speed of rotation finally determined in a1). That is, in the example illustrated in FIG. 5, pump A, pump B, and the driving motor 120 may be controlled to operate according to DispA2, DispB2, and RPM1.

Figure 6:
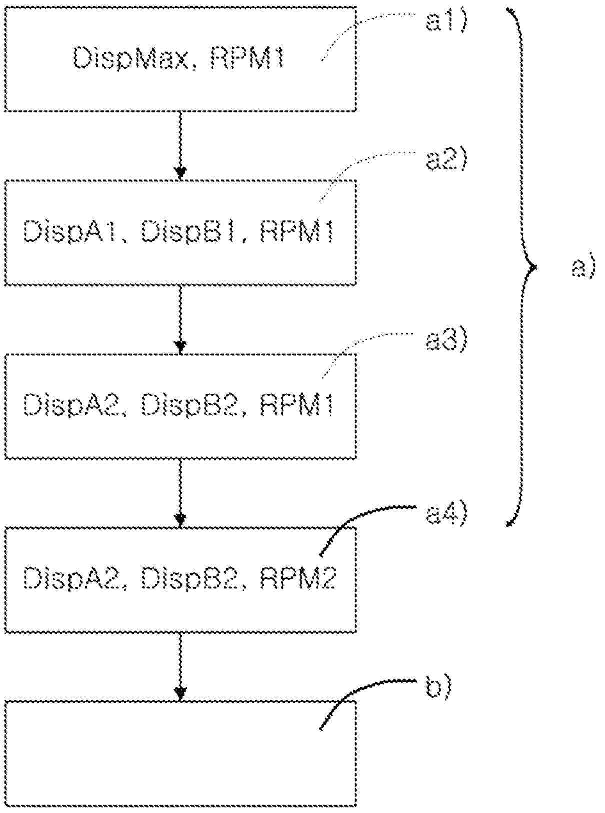
FIG. 6 is a diagram illustrating a process according to a modified example in which the controller controls the first pump, the second pump, and the driving motor in response to inputs received through the first operator input device and the second operator input device.

FIG. 6 is a diagram illustrating a process according to a modified example in which the controller controls the first pump, the second pump, and the driving motor in response to inputs received through the first operator input device and the second operator input device.

a1) to a3) The operations a1) to a3) of the example illustrated in FIG. 5 are performed.

a4) Afterwards, speeds of rotation RPMA2 and RPMB2 at which pumps A and B discharges QAreq and QBreq with DispA2 and DispB2 may be determined, and RPM2 according to RPMA2 and RPMB2 (i.e., RPM2 varying according to RPMA2 and RPMB2) may be determined. In some examples, a higher value, a lower value, or an average value of RPMA2 and RPMB2 may be determined as RPM2.

In some examples, when RPM2 is higher than a predetermined mode-specific speed of rotation corresponding to a mode selected by using the second operator input device, the predetermined mode-specific speed of rotation may be determined as RPM2.

b) Afterwards, pump A, pump B, and the driving motor 120 may be controlled to operate according to the displacements and the speed of rotation finally determined in a4). That is, in the example illustrated in FIG. 6, pump A, pump B, and the driving motor 120 may be controlled to operate according to DispA2, DispB2, and RPM2.

Figure 7:
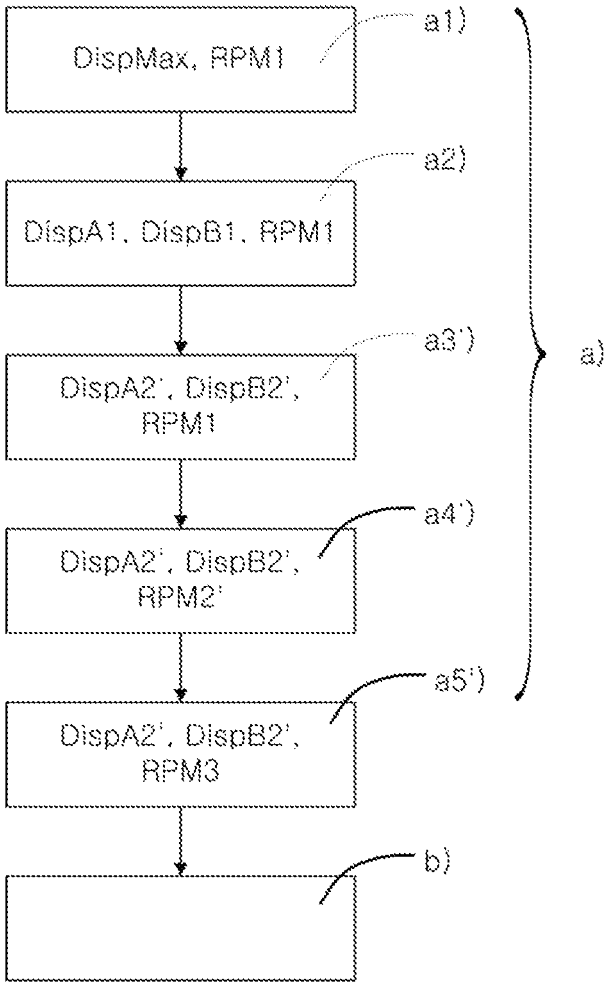
FIG. 7 is a diagram illustrating a process according to a modified example in which the controller controls the first pump, the second pump, and the driving motor in response to inputs received through the first operator input device and the second operator input device.

FIG. 7 is a diagram illustrating a process according to a modified example in which the controller controls the first pump, the second pump, and the driving motor in response to inputs received through the first operator input device and the second operator input device.

a1 and a2) Since operations a) and b) of the example illustrated in FIG. 7 are the same as the operations a) and b) of the example illustrated in FIGS. 4 to 6, a description thereof will be omitted.

a3') Afterwards, DispA1 and DispB1 may be limited to DispA2' and DispB2' so that a sum of output torque of pump A and output torque of pump B is equal to or less than a predetermined maximum output torque that both pump A and pump B may generate together.

In the example illustrated in FIG. 7, the maximum output torque may be a predetermined maximum torque that both pump A and pump B may generate together in terms of hardware. Thus, DispA2' and DispB2' may be determined by the following Equations.

$$\text{Disp}A2' = \text{Disp}A1 \times (\text{predetermined maximum output torque that both pump } A \text{ and pump } B \text{ may generate together in terms of hardware})/(\text{sum of the output torque of pump } A \text{ and the output torque of pump } B)$$

$$\text{Disp}B2' = \text{Disp}B1 \times (\text{predetermined maximum output torque that both pump } A \text{ and pump } B \text{ may generate together in terms of hardware})/(\text{sum of the output torque of pump } A \text{ and the output torque of pump } B)$$

In some examples, the maximum output torque that both pump A and pump B may generate together in terms of hardware may be set in consideration of the efficiencies of the pumps.

a4') Afterwards, speeds of rotation RPMA2' and RPMB2' at which pumps A and B discharge QAreq and QBreq with DispA2' and DispB2' may be determined, and RPM2' according to RPMA2' and RPMB2' (i.e., RPM2' varying according to RPMA2' and RPMB2') may be determined. In some examples, a higher value, a lower value, or an average value of RPMA2' and RPMB2' may be determined as RPM2'.

In some examples, when RPM2' is higher than a predetermined mode-specific speed of rotation corresponding to a mode selected by using the second operator input device, the predetermined mode-specific speed of rotation may be determined as RPM2'.

a5') Afterwards, the controller 170 may limit RPM2' to RPM3 so that a sum of output power of pump A and output power of pump B is equal to or less than predetermined mode-specific maximum output power, corresponding to a mode selected by using the second operator input device 190, which pump A and pump B may generate together.

The controller 170 may determine RPM3 by the following Equation.

$$\text{RPM3} = \text{RPM2'} \times \text{Power ratio}$$

Here, power ratio=(predetermined mode-specific maximum output power, corresponding to a mode selected by using the second operator input device 190, which both pump A and pump B may generate together)/(sum of output power of pump A and output power of pump B).

The minimum of the power ratio is 0, whereas the maximum of the power ratio is 1.

b) Pump A, pump B, and the driving motor 120 may be controlled to operate according to the displacements and the speed of rotation finally determined in a5'). That is, pump A, pump B, and the driving motor 120 may be controlled to operate according to DispA2', DispB2', and RPM3.

In some examples, when RPM3 is equal to or lower than a predetermined minimum speed of rotation, the predetermined minimum speed of rotation may be determined as RPM3.

In some examples, when RPM3 is higher than a predetermined mode-specific minimum speed of rotation corresponding to a mode selected by using the second operator input device, the predetermined mode-specific minimum speed of rotation may be determined as RPM3.

In some examples, when no operator's desire is input through the first operator input device (i.e., when idling), the predetermined minimum speed of rotation or the predetermined mode-specific speed of rotation may be determined as RPM3.

The terminology used herein is for the purpose of describing particular aspects only and is not intended to be limiting of the disclosure. As used herein, the singular forms “a,” “an,” and “the” are intended to include the plural forms as well, unless the context clearly indicates otherwise. As used herein, the term “and/or” includes any and all combinations of one or more of the associated listed items. It will be further understood that the terms “comprises,” “comprising,” “includes,” and/or “including” when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as “below” or “above” or “upper” or “lower” or “horizontal” or “vertical” may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being “connected” or “coupled” to another element, it can be directly connected or coupled to the other element, or intervening elements may be present. In contrast, when an element is referred to as being “directly connected” or “directly coupled” to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A hydraulic machine comprising:

an actuator;

a first pump and a second pump configured to supply pressurized fluid to the actuator;

a driving motor configured to drive the first and second pumps;

a first operator input device through which an operator's desire to operate the actuator is input; and a controller, wherein the controller is configured to:

a) determine first and second displacements of the first and second pumps corresponding to the operator's desire and a speed of rotation of the driving motor; and b) control the first pump, the second pump, and the driving motor to operate according to the determined displacements of the first and second pumps and the speed of rotation of the driving motor, wherein the determination of the first and second displacements comprises an operation a1) in which the controller determines desired first and second flow rates of the first and second pumps corresponding to the operator's desired input through the first operator input device, determines a maximum displacement of the first and second pumps, determines first and second speeds of rotation at which the first and second pumps discharge the first and second flow rates with the maximum displacement, and determines a first value according to the first and second speeds of rotation.

2. The hydraulic machine of claim 1, wherein the controller determines a higher value, a lower value, or an average value of the first and second speeds of rotation as the first value.

3. The hydraulic machine of claim 1, wherein the determination of the first and second displacements comprises an operation a2) in which the controller determines the first displacement of the first pump with which the first pump discharges the first flow rate at the first value and the second displacement of the second pump with which the second pump discharges the second flow rate at the first value.

4. The hydraulic machine of claim 3, wherein the determination of the first and second displacements comprises an operation a3) in which the controller limits the first displacement and the second displacement to a third displacement and a fourth displacement, respectively, so that a sum of a first output torque of the first pump and a second output torque of the second pump is equal to or less than a predetermined maximum output torque that both the first pump and the second pump are able to generate together.

5. The hydraulic machine of claim 4, wherein the determination of the first and second displacements comprises an operation a4) in which the controller determines a third speed of rotation at which the first pump discharges the first flow rate with the third displacement and a fourth speed of rotation at which the second pump discharges the second flow rate with the fourth displacement, and determines a second value according to the third speed of rotation and the fourth speed of rotation.

6. The hydraulic machine of claim 5, wherein the controller determines a higher value, a lower value, or an average value of the third and fourth speeds of rotation as the second value.

7. The hydraulic machine of claim 5, further comprising a second operator input device configured to receive an operator's desire for mode, wherein when the determined second value is higher than a predetermined mode-specific speed of rotation corresponding to a mode selected by using the second operator input device, the predetermined mode-specific speed of rotation is determined as the second value.

8. The hydraulic machine of claim 4, wherein the controller determines the third displacement and the fourth displacement by following equations:

third displacement=first displacement×a torque ratio; and fourth displacement=second displacement×torque ratio, where the torque ratio is equal to a predetermined maximum output torque, which both the first pump and the second pump are able to generate together, divided by a sum of the first output torque of the first pump and the second output torque of the second pump, and a minimum of the torque ratio is 0, whereas a maximum of the torque ratio is 1.

9. The hydraulic machine of claim 4, further comprising a second operator input device configured to receive an operator's desire for mode, wherein the maximum output torque is a predetermined mode-specific maximum torque, which both the first pump and the second pump are able to generate together, corresponding to a mode selected by using the second operator input device.

10. The hydraulic machine of claim 3, wherein the determination of the first and second displacements comprises an operation a3) in which the controller limits the first displacement and the second displacement to a third displacement and a fourth displacement so that a sum of the first output torque of the first pump and the second output torque of the second pump is equal to or less than a predetermined maximum output torque that both the first pump and the second pump are able to generate together, the maximum output torque being a predetermined maximum torque that both the first pump and the second pump are able to generate together in terms of hardware.

11. The hydraulic machine of claim 10, further comprising a second operator input device configured to receive an operator's desire for mode, wherein the determination of the first and second displacements comprises:

an operation a4) in which the controller determines a third speed of rotation at which the first pump discharges the first flow rate with the third displacement and a fourth speed of rotation at which the second pump discharges the second flow rate with the fourth displacement, and determines a second value according to the third speed of rotation and the fourth speed of rotation; and an operation a5) in which the controller limits the second value to a third value so that a sum of output power of the first pump and output power of the second pump is equal to or less than a predetermined mode-specific maximum output power, which the first pump and the second pump are able to generate together, corresponding to a mode selected by using the second operator input device.

12. The hydraulic machine of claim 11, wherein the controller determines the third value by a following equation:

third value=second value×a power ratio, where the power ratio is equal to a predetermined mode-specific maximum output power, which both the first pump and the second pump are able to generate together, corresponding to the mode selected by using the second operator input device divided by a sum of output power of the first pump and output power of the second pump, and a minimum value of the power ratio is 0, whereas a maximum of the power ratio is 1.

13. The hydraulic machine of claim 11, wherein when the determined third value is lower than a predetermined minimum speed of rotation, the predetermined minimum speed of rotation is determined as the third value.

14. The hydraulic machine of claim 11, wherein when the determined third value is higher than a predetermined mode-specific speed of rotation corresponding to the mode selected by using the second operator input device, the predetermined mode-specific maximum speed of rotation is determined as the third value.

15. The hydraulic machine of claim 11, wherein when no operator's desire is input through the first operator input device, a predetermined minimum speed of rotation or a predetermined mode-specific speed of rotation corresponding to the mode selected by using the second operator input device is determined as the third value.

16. The hydraulic machine of claim 1, further comprising a second operator input device configured to receive an operator's desire for mode, wherein the controller determines flow rates corresponding to a predetermined mode-specific speed of rotation corresponding to a mode selected by using the second operator input device and a third displacement of the first pump and a fourth displacement of the second pump corresponding to the operator's desired input through the first operator input device, as the first flow rate and the second flow rate.

17. The hydraulic machine of claim 1, further comprising a control valve disposed between the first and second pumps and the actuator to allow or block supply flow of pressurized fluid from the first pump and the second pump to the actuator, wherein the control valve is operated to have a degree of opening corresponding to the operator's desired input through the first operator input device.

18. The hydraulic machine of claim 1, wherein when at least one of the determined first speed of rotation and the determined second speed of rotation is lower than a predetermined minimum speed of rotation, the predetermined minimum speed of rotation is determined as the at least one of the determined first speed of rotation and the determined second speed of rotation.

* * * * *